(12) United States Patent
Peitzke et al.

(10) Patent No.: US 7,578,278 B2
(45) Date of Patent: Aug. 25, 2009

(54) MULTILOBE ROTARY MOTION ASYMETRIC COMPRESSION/EXPANSION ENGINE

(75) Inventors: William R. Peitzke, Montecito, CA (US); Lawrence Howes, Santa Barbara, CA (US); Matt Brown, San Diego, CA (US); James G. P. Dehlsen, Montecito, CA (US)

(73) Assignee: Gyroton Corporation, Carpinteria, CA (US)

( * ) Notice: Subject to any disclaimer, the term of this patent is extended or adjusted under 35 U.S.C. 154(b) by 0 days.

(21) Appl. No.: 11/246,049

(22) Filed: Oct. 7, 2005

(65) Prior Publication Data
US 2007/0240674 A1 Oct. 18, 2007

Related U.S. Application Data

(60) Provisional application No. 60/617,466, filed on Oct. 7, 2004.

(51) Int. Cl.
*F02B 53/00* (2006.01)
*F02B 57/00* (2006.01)
*F01C 1/00* (2006.01)
*F04C 18/00* (2006.01)
*F04C 2/00* (2006.01)

(52) U.S. Cl. .................. 123/241; 123/43 C; 123/43 R; 123/243; 418/264

(58) Field of Classification Search ............ 123/241, 123/243, 226, 227, 206, 229, 43 C, 43 R; 418/260, 266–268, 178, 136, 149
See application file for complete search history.

(56) References Cited

U.S. PATENT DOCUMENTS

| | | | | |
|---|---|---|---|---|
| 1,349,353 A | * | 8/1920 | Wilber, Jr | 123/227 |
| 1,458,361 A | * | 6/1923 | Ruttledge | 418/136 |
| 2,121,660 A | * | 6/1938 | Hammers | 123/241 |
| 3,306,269 A | * | 2/1967 | Dimmock, Jr | 123/227 |
| 3,400,691 A | * | 9/1968 | Jones | 418/121 |
| 3,486,487 A | * | 12/1969 | Kelly | 123/243 |
| 3,855,977 A | | 12/1974 | Statkus | 123/43 C |
| 3,923,013 A | | 12/1975 | Myers | 123/241 |
| 3,927,647 A | * | 12/1975 | Blackwood | 123/43 C |
| 3,938,478 A | * | 2/1976 | Piper | 123/229 |
| 4,038,948 A | * | 8/1977 | Blackwood | 123/43 C |
| 4,106,472 A | * | 8/1978 | Rusk | 123/243 |
| 4,389,173 A | * | 6/1983 | Kite | 123/206 |
| 5,261,365 A | * | 11/1993 | Edwards | 123/241 |
| 5,711,268 A | * | 1/1998 | Holdampf | 123/243 |
| 5,791,888 A | * | 8/1998 | Smith | 418/149 |
| 6,484,687 B1 | | 11/2002 | Duncan | 123/241 |

(Continued)

FOREIGN PATENT DOCUMENTS

DE 4225932 A1 * 2/1994 ................. 123/241

(Continued)

OTHER PUBLICATIONS

A translation copy of Patent No. JP 61-241420 A.*

*Primary Examiner*—Thai Ba Trieu
(74) *Attorney, Agent, or Firm*—Felix L. Fischer

(57) ABSTRACT

A rotary engine with multiple pivotally mounted lobes desmodromically extendible and retractable from a rotor to trace asymmetric volumes for inlet and compression and expansion and exhaust based on the contour of the engine case which the lobes sealingly engage.

25 Claims, 16 Drawing Sheets

U.S. PATENT DOCUMENTS

| | | | |
|---|---|---|---|
| 6,668,767 B1 * | 12/2003 | Sanchez Talero et al. | 123/43 R |
| 6,688,276 B2 * | 2/2004 | Baptista et al. | 123/43 C |
| 6,796,285 B2 * | 9/2004 | Karnes | 123/241 |
| 7,117,841 B2 * | 10/2006 | Kernes | 123/241 |
| 7,143,737 B2 * | 12/2006 | Kim | 123/241 |

FOREIGN PATENT DOCUMENTS

| | | | |
|---|---|---|---|
| FR | 2121906 A5 * | 8/1972 |
| GB | 1432971 * | 4/1976 |
| JP | 61241420 A * | 10/1986 |
| JP | 05105537 A * | 4/1993 |
| SU | 1017803 A * | 5/1983 |
| WO | WO 9508699 A1 * | 3/1995 |

* cited by examiner

MULTILOBE ROTARY MOTION ASYMETRIC COMPRESSION/EXPANSION ENGINE

REFERENCE TO RELATED APPLICATIONS

This application claims priority of U.S. Provisional Application Ser. No. 60/617,466 filed on Oct. 7, 2004 and having the same title as the present application.

BACKGROUND OF THE INVENTION

1. Field of the Invention

This invention relates generally to the field of rotary motion internal combustion engines and more particularly to an engine having a rotor with multiple lobes circumscribing asymmetric compression and expansion areas and providing multiple combustion cycles within a single rotation.

2. Description of the Related Art

Internal combustion engines with reciprocating pistons or circular motion rotors have been commonplace in the art for many years. Optimization of the mechanical systems associated with such engines to maximize the performance in thermodynamic efficiency, power output and emissions reduction while limiting mechanical complexity is continually ongoing. Rotary or Wankel engines typically reduce the number of moving parts in the engine and provide mechanical efficiency.

The ability to provide asymmetric compression and expansion ratios in an internal combustion engine increases the thermodynamic efficiency, however, such asymmetry is typically only obtained at the expense of significantly increased mechanical complexity. It is therefore desirable to provide an engine with asymmetric compression and expansion ratios with mechanical simplicity.

SUMMARY OF THE INVENTION

The present invention incorporates an engine case containing a rotor with a plurality of lobes carried by the rotor. The lobes are extendible from a cylindrical surface of the rotor to maintain sealing contact with a contoured wall of the case. The contour incorporates a first portion diverging from a first tangency point between the rotor and case wall and a second portion contracting from a first maximum divergence to a second tangency point between the rotor and case, a third portion diverging from the second tangency point to a second maximum divergence and a fourth portion converging to the first tangency point. The first and second portion define a first volume and the third and fourth portion define a second volume swept by each pair of adjacent lobes. In selected embodiments, the first volume and second volume are asymmetric allowing tailored compression and expansion ratios for operation of the engine. Also in selected embodiments, the case contour incorporates as an element of the second portion an arc concentric with and proximate to the diameter of the rotor while approaching the second tangency point to create a minimum volume and to extend the time of maximum compression to fully initiate combustion prior to expansion. The contour also incorporates a similar element in the region of the termination of the fourth portion and the beginning of the first portion wherein an arc concentric with and proximate to the diameter of the rotor acts as a volume separation between the exhaust and subsequent intake. A combustion air inlet proximate the first tangency point and first portion of the contour provides combustion air while an exhaust outlet proximate the fourth portion of the contour allows exhaust of the combustion products. An ignition means carried between adjacent lobes to initiate combustion of the combustion air with a leading lobe and a trailing lobe oppositely adjacent the second tangency point.

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

Figure 1:
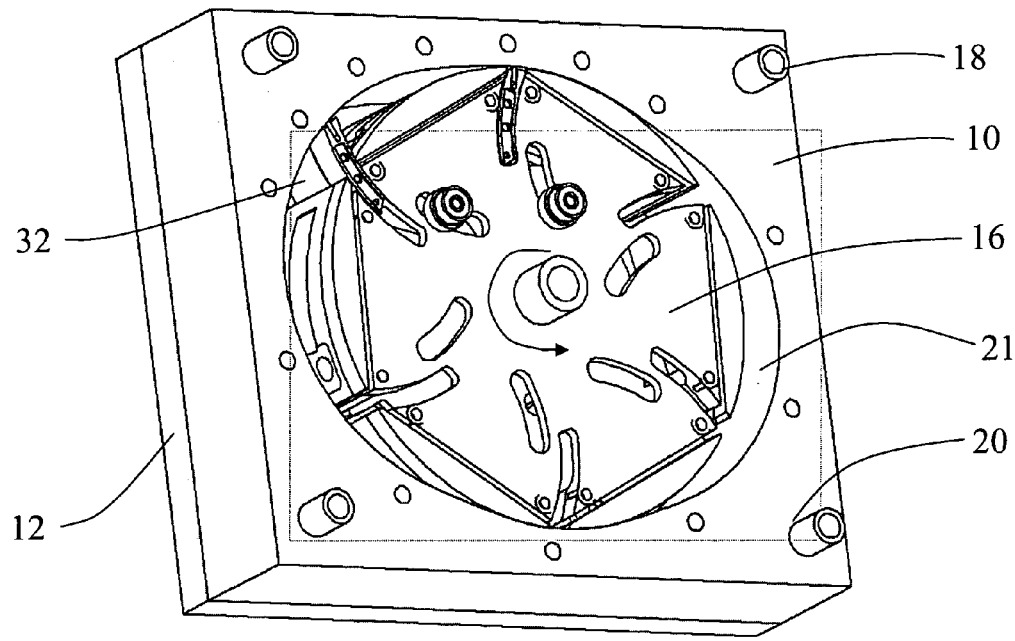
FIG. 1 is a partial view of an engine embodying the present invention with the bottom plate, engine case, lobes and rotor assembly shown separately from the remainder of the engine.

Referring to the drawings, in FIG. 1, an embodiment of an engine employing the present invention is shown. An outer structure including a case 10 with a bottom plate 12 (partially sectioned in the view) and top plate 14 (FIGS. 4a & 5a) encloses a rotor 16. For the embodiment shown, the top and bottom plates align to the case with pins 18 received in holes 20.

Figure 2:
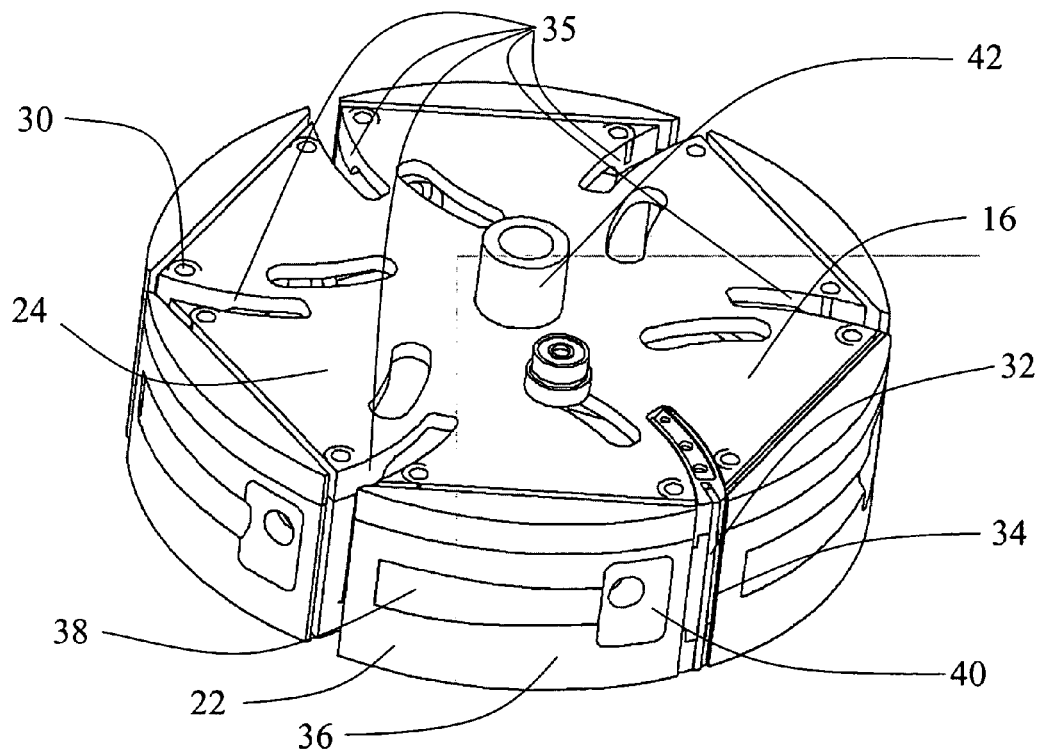
FIG. 2 is an isometric view of the rotor body, lobes and rotor top.
Figure 3A:
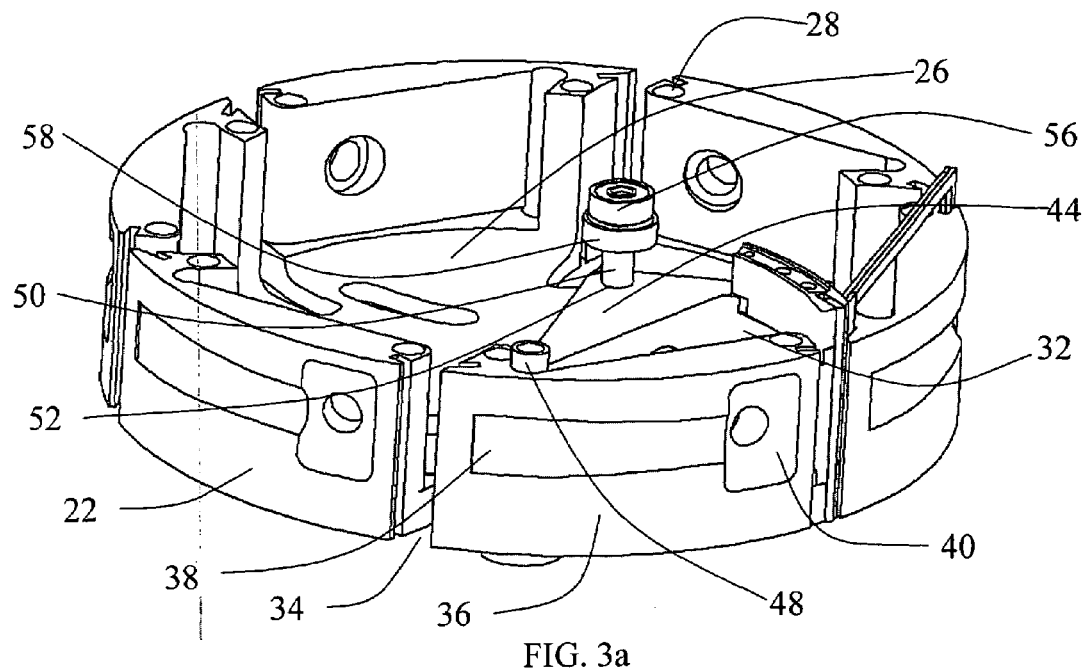
FIG. 3a is an isometric upper view of the rotor with the rotor top removed and one lobe and actuating mechanism in the retracted position.
Figure 3B:
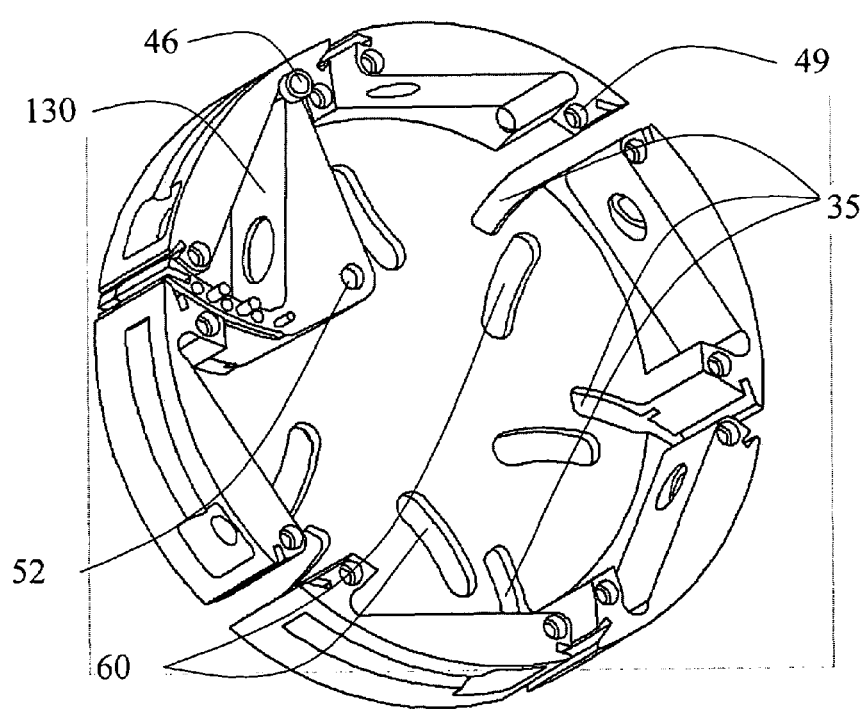
FIG. 3b is an open view of the rotor with a only a single integral lobe/pivot arm in position showing the rotation pins on which the lobe pivots during extension/retraction, the receiving holes in the rotor for the bushing that receive the rotation pins that hinge and support the lobe/pivot arm in the rotor and the hole in the pivot arm flange which receives the axle for the pivot arm actuation bearings.

The rotor has a body 22 and a cover 24 as shown in FIG. 2 and in FIG. 3a with the cover removed to show the interior chamber 26 of the rotor. The cover is secured to the body of the rotor using bolts received in holes 28 through countersunk holes 30 in the cover. The rotor and cover are machined, sealed and bolted to form an airtight junction. Multiple lobes 32 are extendible and retractable into vertical slots 34 in the substantially cylindrical surface 36 of the rotor. Arcuate slots 35 in the rotor bottom and cover extend from the vertical slots to receive the lobes where they articulate from their pivot inside the rotor as will be described in greater detail subsequently. For clarity, only one lobe is shown in the rotor body in FIGS. 3a & 3b. Compression ramps 38 and fixed combustion chamber volumes 40 are created in relieved sections of the rotor surface, the functions of which will be described in greater detail subsequently. Hollow drive shafts 42 extend from the rotor cover and bottom of the rotor through bearings in the top and bottom plates of the engine case. For the embodiments shown in the drawings, the rotation of the rotor is counter-clockwise as viewed from the top plate side in FIG. 1. and clockwise when viewed from the bottom plate side in FIGS. 5b, and 9a-9e.

As seen in FIG. 3a, each lobe 32 is supported by triangular shaped pivot arms 44 with a joining web 130 and pivot pins 46 (best seen in FIG. 4b) mounted distal from the lobe engaged in bushings 48 received in holes 49 in the rotor bottom and cover. The pivot motion of each lobe is guided throughout rotor rotation via cam bearings affixed to a cam axle 50 received through a bore 52 in vertices 54 in the pivot arms. An extension cam bearing 56 and a retraction cam bearing 58 are supported at each end of the axle. Reciprocation of the lobes is desmodromic with the cam bearings riding in recessed cam races in the top and bottom plates of the engine case. For the embodiment shown, the retraction cam bearing is larger in diameter than the extension cam bearing and is located inboard on the axle. The cam axle extends from the pivot arms through arcuate slots 60 in the cover and bottom of the rotor into cam races 62 in the top and bottom plates of the engine case.

Figure 4A:
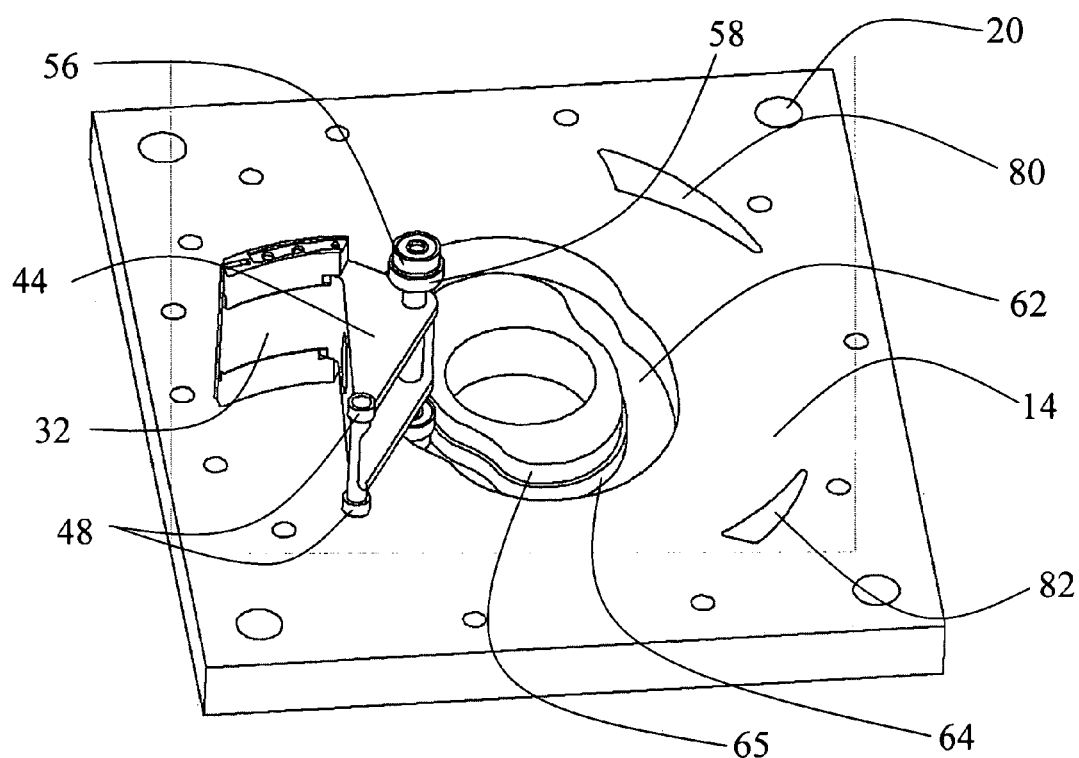
FIG. 4a is an isometric view of one reciprocating lobe, associated actuation components and lobe side seals.
Figure 4B:
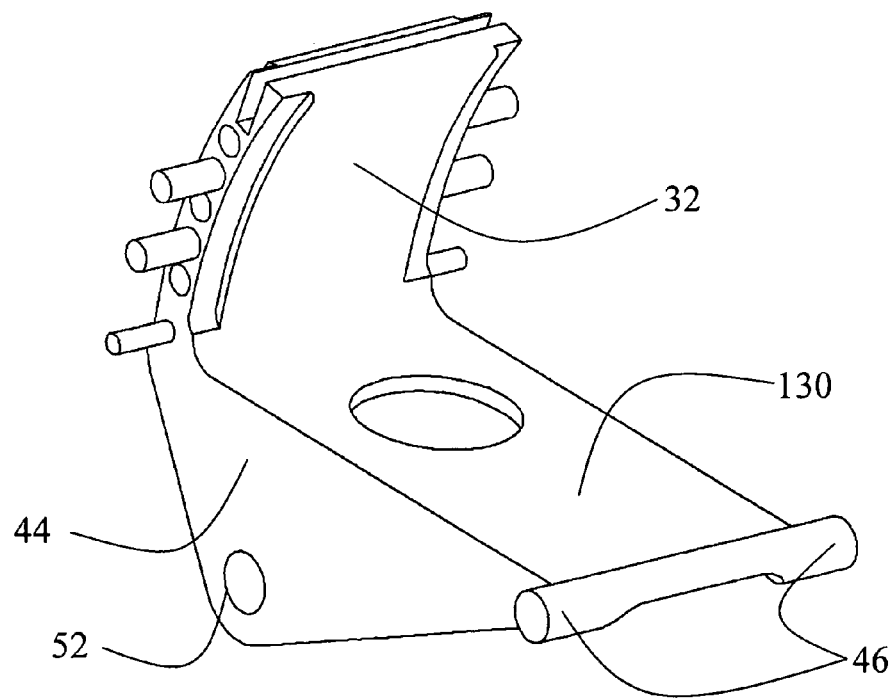
FIG. 4b shows the lobe/pivot arm, pivot arm flange as well as the rotation pins.
Figure 4C:
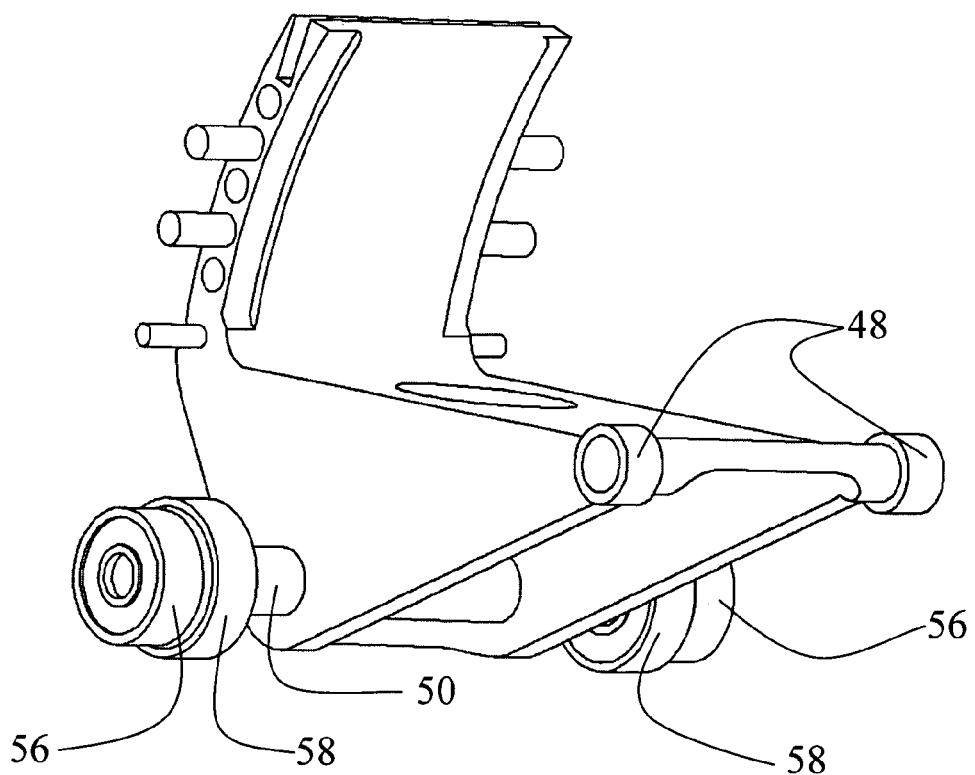
FIG. 4c is a view of FIG. 4b with the rotation pin bushings, actuation axle and bearings installed.
Figure 5A:
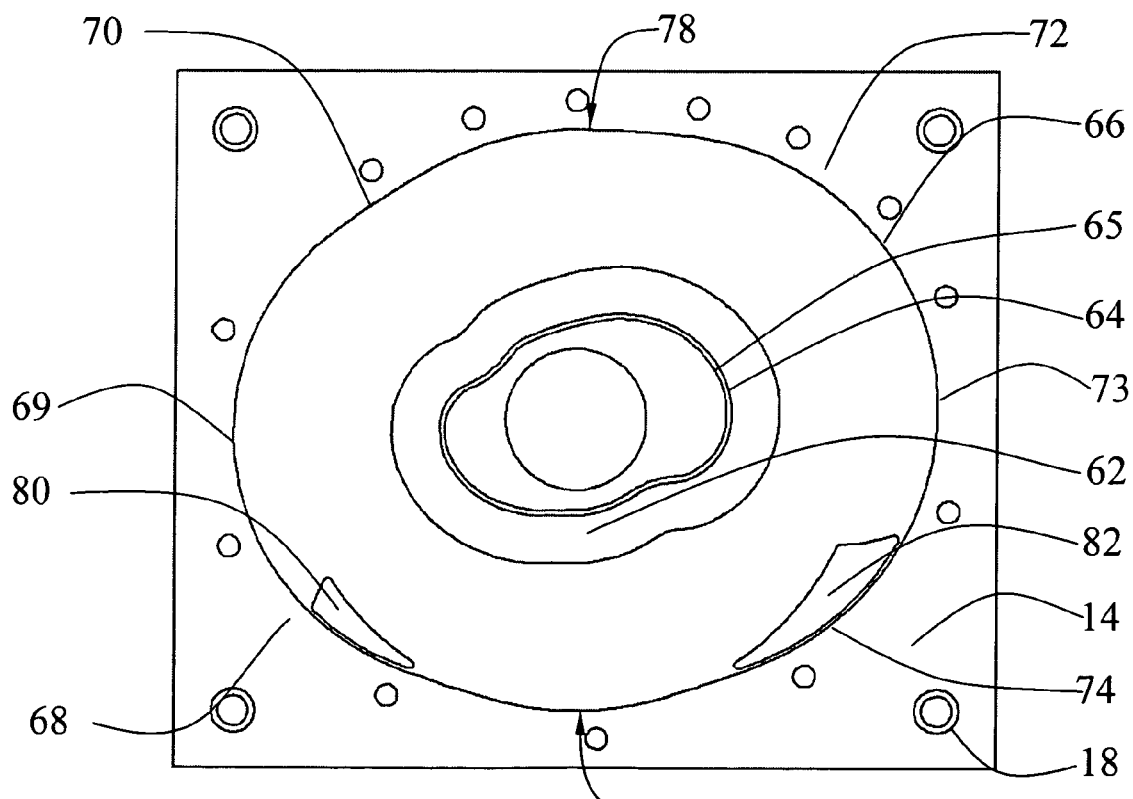
FIG. 5a is a back view of the engine case and inside of the top plate of the engine with the top plate desmodromic cam race shown.

As best seen in FIGS. 4a and 5a, the inner wall of the cam race employs a stepped configuration having an outer step 64 extending to engage the smaller diameter extension cam bearing. The inner step 65 provides clearance for the larger diameter retraction cam bearing which engages the outer wall of the cam race. The extension and retraction cam bearings rotate in opposite directions and with the arrangement shown for this embodiment no reversal of rotation direction is required by the bearings for extension or retraction of the lobe thereby enhancing the reliability and life of the bearings. The retraction of the lobe occurs against the centripetal forces exerted on the lobes due to rotation of the rotor. Placement of the retraction bearing inboard of the extension bearing reduces the bending moments in the axle. The desmodromic actuation maintains the lobe position in sealing contact with the wall of the engine case 21 and controls the forces between the lobe tip seals and case wall.

Also shown in FIG. 5a is the contour of the wall 66 of the engine case, which provides for the compression ratio and expansion ratio to have precisely definable asymmetry for the desired combustion cycle. An inlet portion 68 of the contour from where the rotor and case wall are substantially tangent shown in this embodiment as bottom dead center (BDC) 76 to a maximum divergence point 69 and a compression portion 70 from the maximum divergence point to the point where the rotor and case wall are again substantially tangent which in the embodiment shown occurs before top dead center (TDC) 78 defines the compression ratio while an expansion portion 72 from the second tangency point near TDC to a second maximum divergence 73 and an exhaust portion 74 of the contour from the second maximum divergence to the first tangency point define the expansion ratio. In the embodiment shown, two portions of the case contour are arcs substantially tangent or concentric with the rotor; a combustion portion 77 which starts prior to TDC to form a minimum volume and extend the time of maximum compression prior to combustion and expansion and a volume separation 79 between the exhaust and subsequent intake. The contour elements are referenced in FIG. 5b and rotor rotation is indicated by arrow 75. The combustion cycle will be explained in detail with respect to FIGS. 9a-h. The references herein to TDC and BDC are for description of the geometrical relationship of the engine components only. The actual orientation of the engine as a whole in many applications may be horizontal.

Figure 5B:
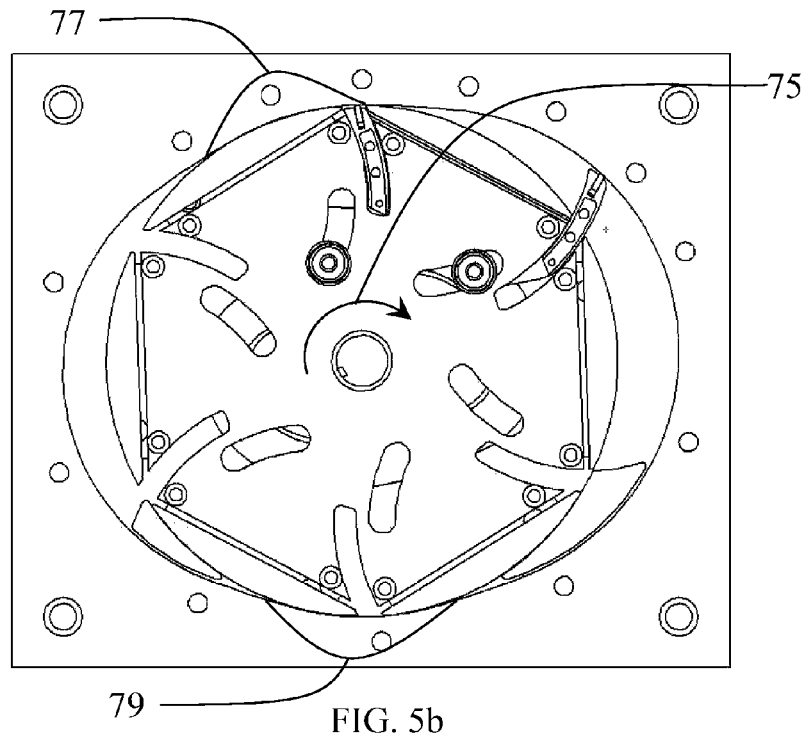
FIG. 5b is view of FIG. 5a with rotor in place indicating direction of rotation as well as primary tangency points.

Referring to FIG. 5b beginning at BDC, responsive to the contour of the case wall the volume between any two lobes expands after the leading lobe departs from the volume separation 79 to a point of maximum volume at which the trailing lobe crosses and closes the intake port 80 from which point the volume is compressed until the trailing lobe reaches the combustion portion 77 and the leading lobe is exiting the combustion portion placing the combustion chamber volume 40 substantially at TDC. The engine case wall in the combustion portion is substantially concentric with rotor diameter and forms a region of maximum compression, the length and position of the arc in the combustion portion varies in alternative embodiments. As the leading lobe exits the compression portion arc, the volume between the leading and trailing lobes expands to a point of maximum expansion. As the volume between the leading and trailing lobes is swept past the point of maximum expansion the leading lobe uncovers the exhaust port 82 and the combusted gas in the volume is then expelled. The arc creating the volume separation near BDC is also substantially concentric with the diameter of the rotor and constitutes the second region of minimum volume. In a reduction to practice shown in the embodiments in the drawings, six individual volumes representing the individual volumes between the six desmodromically actuated lobes are progressed through the referenced geometrical process of intake, compression, combustion, expansion and exhaust— with each revolution of the rotor. The engine produces six complete combustion cycles per rotation.

The single rotor geometry allows for optimization of both the compression ratio and expansion ratio to the engine's intended application by engineering the casting and machining contour for the engine case wall and associated cam race for the actuation of the lobe end to case wall contour following, to produce the desired variation in swept volumes.

Variation of expansion and compression ratios for the single rotor design may be accomplished by modifying the divergence from concentric of the case wall volumes, the allocation of arc between tangency points, the allocation of arc of substantially conformal radius and the timing of the covering and uncovering of the intake and exhaust ports relative to the position of the leading and trailing lobes; as well as the volumes of the combustion chamber in the rotor and the compression ramp. For subsequent reference to the embodiment in the drawings in respect to description of the operating cycle, the inlet port 80 and outlet port 82 are shown in the top plate of the engine.

Figure 6:
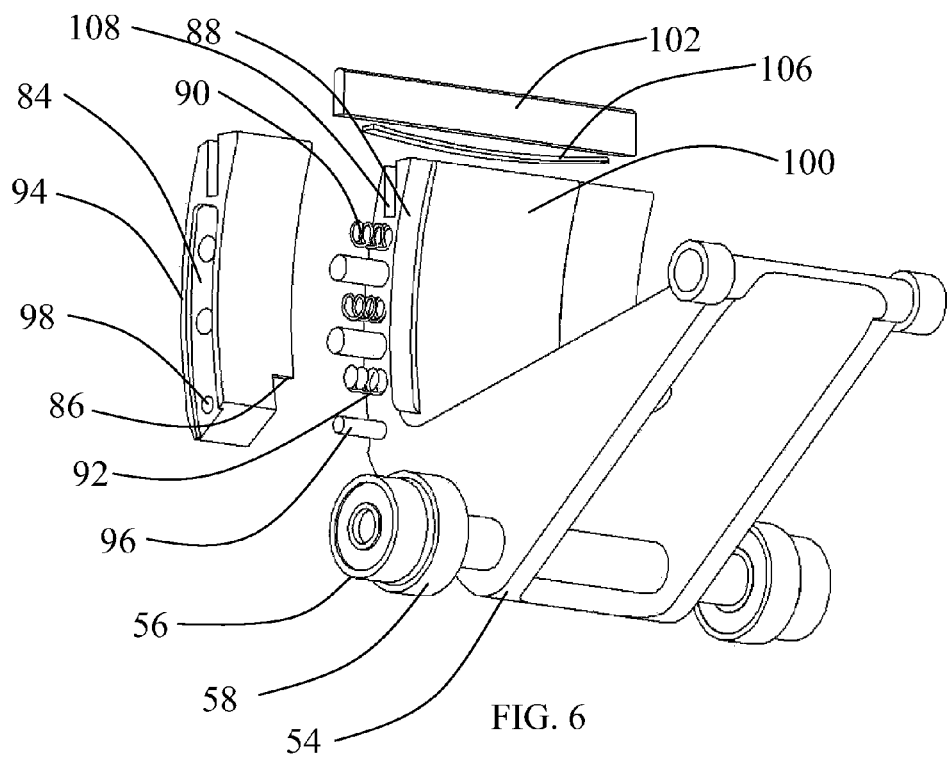
FIG. 6 is an exploded isometric view of the reciprocating lobe, pivot arm seals, seal springs and actuation mechanism.

Sealing of the rotor and lobes to the engine case is accomplished with multiple seal elements. The lobe, as best seen in the detailed drawing FIG. 6, employs lateral seals 84 having a channel 86 received over an edge 88 of the lobe. Coil springs 90 inserted in holes 92 in the lobe edge urges the wipers 94 of the seal against the inner surface of the adjacent plate of the engine case. For the embodiment shown, pins 96 extending from the lobe are received in holes 98 in the seal to linearly constrain the motion of the seal.

The peripheral edge 100 of the lobe and the adjacent mating lateral seals are grooved to receive a tip seal 102. For the embodiment shown, the lobe tip seal is two parts mating diagonally for spring induced loading against the inner circumferential surface of the engine case. A curved spring 106 received in a groove 108 in the peripheral edge of the lobe urges the tip seal of the lobe seal against the case surface.

Figure 7A:
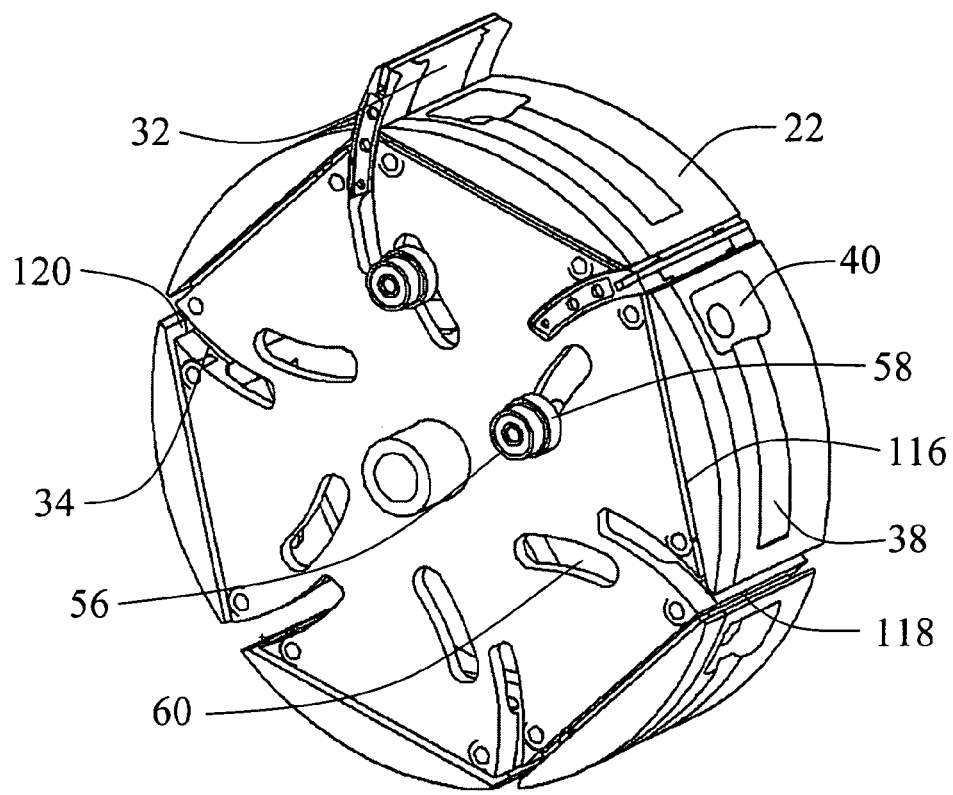
FIG. 7a is a front isometric view of the rotor of FIG. 2 with two lobes and their associated L Seals in place in the rotor cover.
Figure 7B:
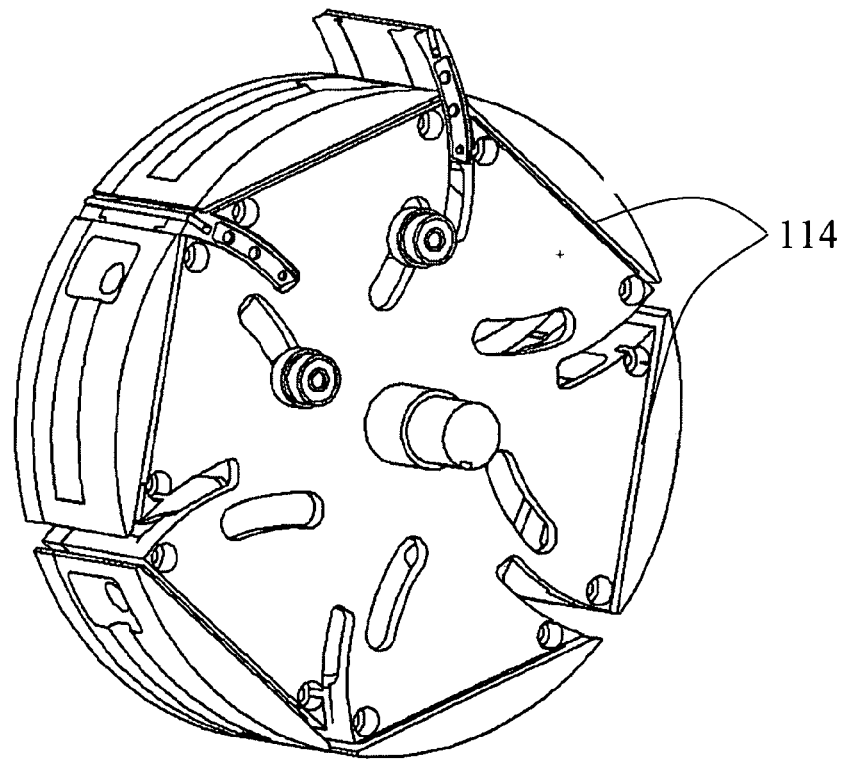
FIG. 7b is a back isometric view of the rotor FIG. 7a with L seals in place in rotor between two installed lobes.
Figure 7C:
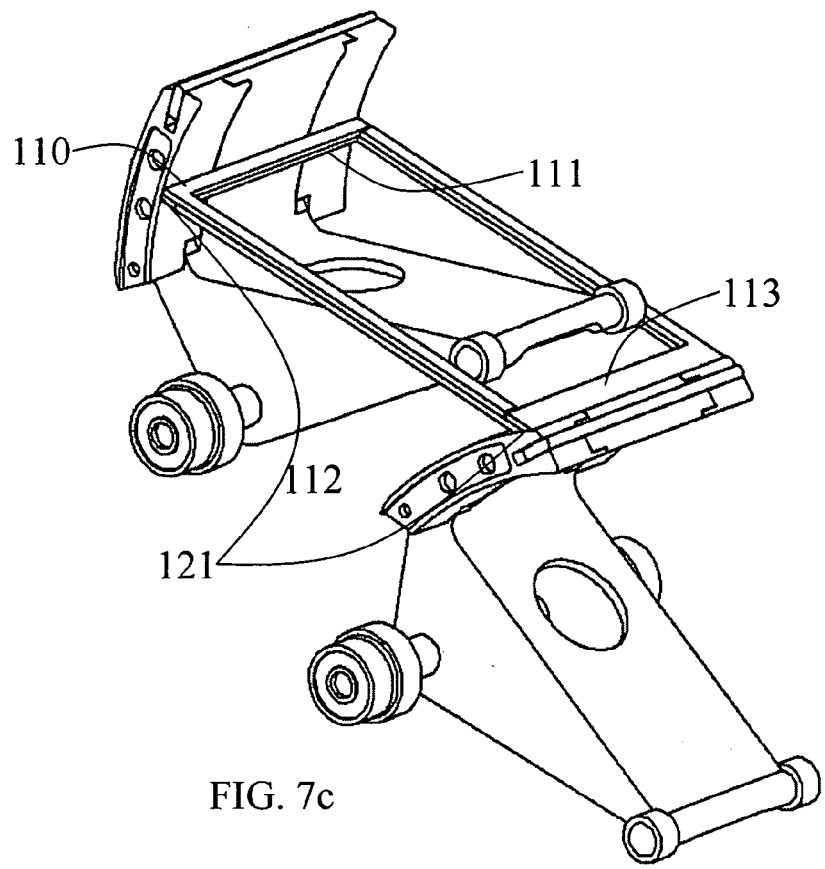
FIG. 7c is a perspective view of one set of rotor L seals in relative position with two associated lobes.
Figure 7D:
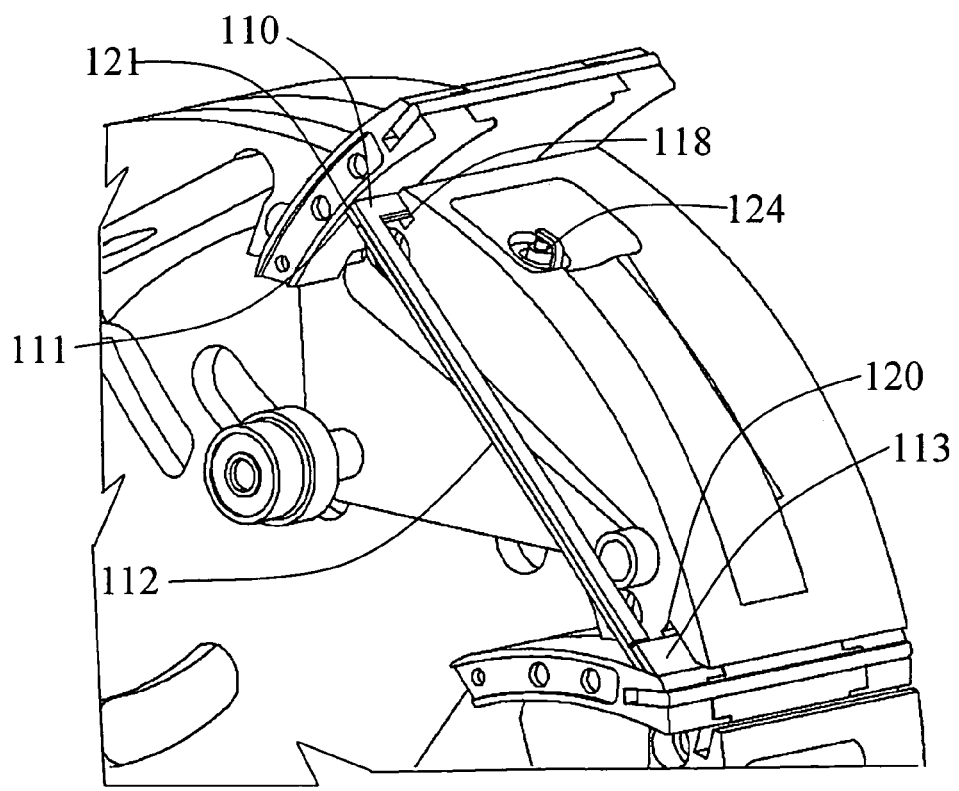
FIG. 7d is the view of FIG. 7c with the main rotor section included and the rotor top plate omitted and components defined.

Sealing the lobe to rotor to the swept volumes within the engine case and the rotor to case between each successive lobe pair is accomplished with mating four spring loaded overlapping L-shaped seals 110, 111, 112 and 113 carried in grooves 114 and 116 on the upper and lower surfaces of the rotor and grooves 118 and 120 in the lobe receiving slots as best seen in FIGS. 7a, 7b and 7c. The grooves 114 and 116 extend between the lobe receiving slots on the upper and lower surface of the rotor. Grooves 118 and 120 interconnect with grooves 114 and 116 and extend along the depth of the lobe receiving slots. As shown in FIG. 7d, L seals 110, 111, 112, 113 collectively occupy groves 114, 116, 118 and 120 effectively sealing their segment of the rotor and their two adjacent lobes. FIG. 7c shows the overlapping mating relationship between the four beveled L seals relative to their respective position between lobe pairs. FIG. 7d shows seals 110, 111, 112 113 in place on the rotor in grooves 114, 118 120, with the rotor cover containing groove 116 omitted for clarity. Single curved springs 122 in each of the grooves urge the L seal elements outward from the grooves for contact with the mating surfaces. The overlapping double L shape provides a rectangular seal but allows differential flexibility of force in each sealing direction. Each L seal has a beveled surface 121 indicated in FIGS. 7c & 7d on the short leg which provides the seal with the sides of the reciprocating lobes. The angle of the beveled surface is unique to the particular seal position in the assembly but common to each respective position within the 6 lobe pairs.

Figure 8:
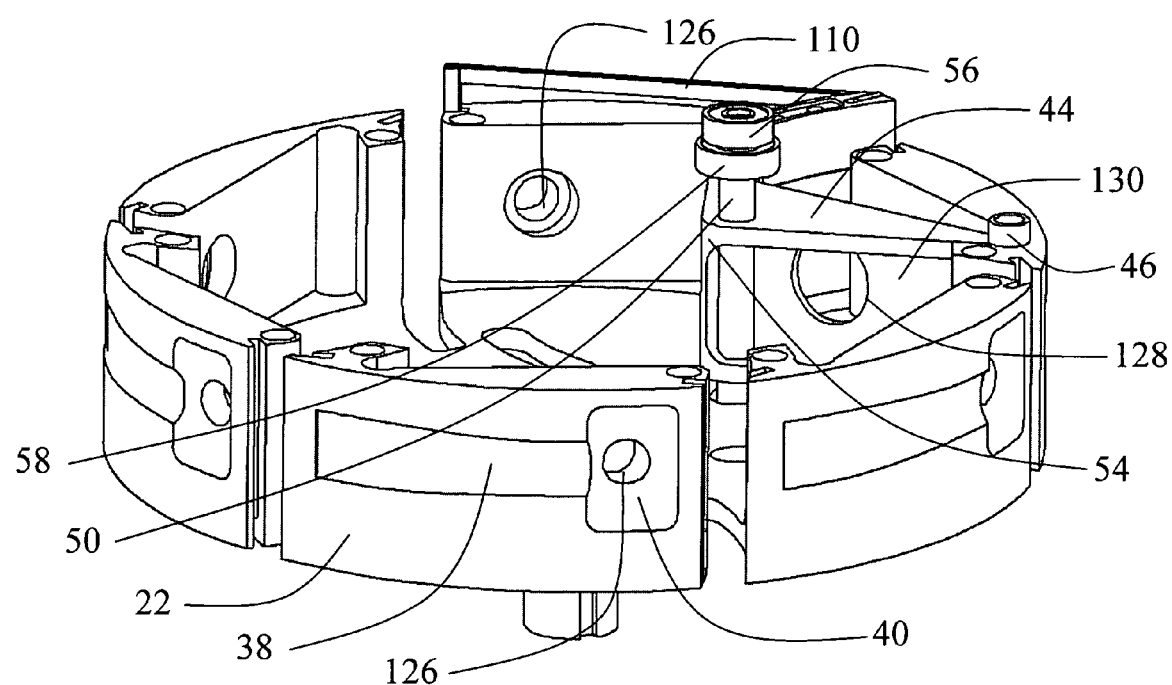
FIG. 8 is an upper isometric view of one lobe with desmodromic actuator bearings and supporting pivot bushings as installed in the rotor.

The embodiment of the invention shown in the drawings employs spark plugs 124 seated in bores 126 extending through the rotor core adjacent the combustion chamber 40 recessed into the rotor face 22. As shown in FIG. 8, the joining web 130 for the pivot arms supporting the lobe incorporates an aperture 128 for clearance and attachment of the sparkplug. Wiring for the sparkplugs is routed through the chamber in the rotor to lugs adjacent the drive shafts. Electrical connection through a rotating distributor integral with the drive shaft provides ignition spark for operation of the engine.

Figure 9A:
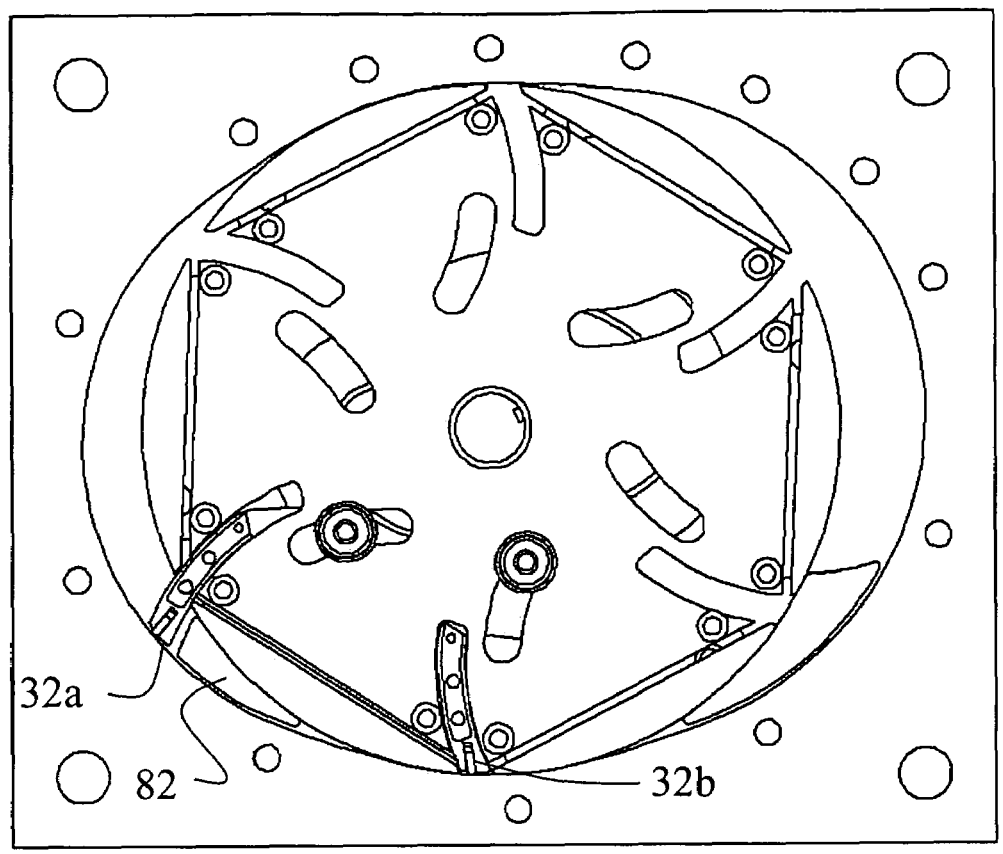
FIGS. 9a-9e are top views of the rotor in the various points of operation in the power cycle of the engine.
Figure 9C:
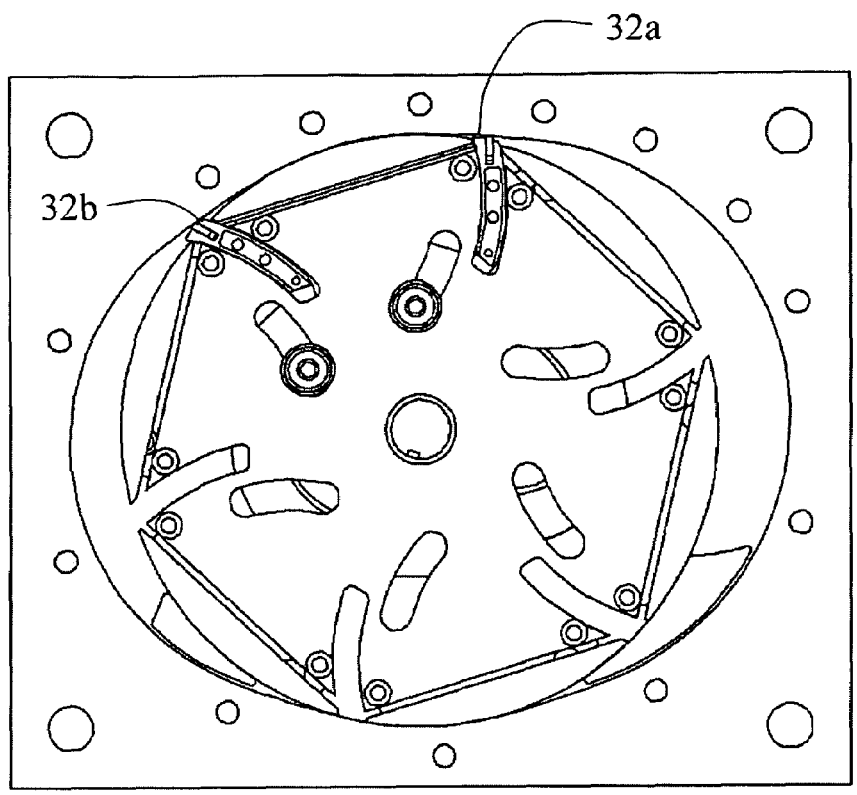
Figure 9B:
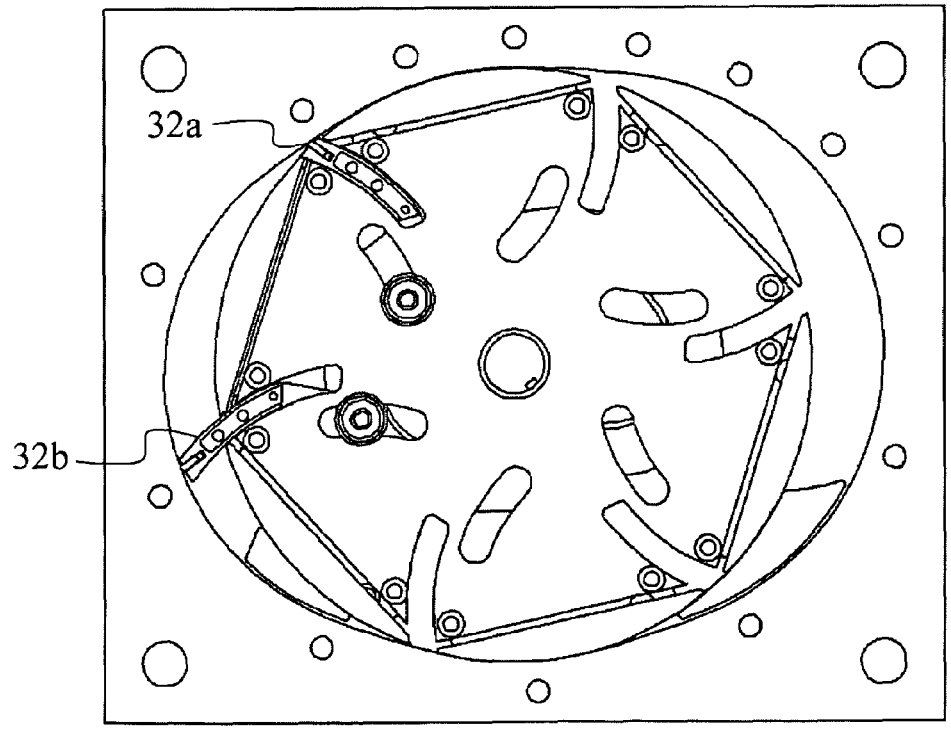

The operating cycle of the engine is shown in FIGS. 9a-9e. Only two lobes are shown in the drawings for clarity. Beginning with FIG. 9a, a leading lobe 32a rotating clockwise from bottom dead center is extending from the rotor desmodromically following the contour of the inner wall of the case, having just passed the inlet port 80. Trailing lobe 32b is fully retracted into the rotor approximately at BDC. Continued rotation of the rotor shows the increasing operating volume between the lobes drawing air through the inlet until the trailing lobe passes the inlet port FIG. 9b shows the intermediate portion of the compression cycle with the leading lobe again substantially fully retracted into the rotor, while the trailing lobe is substantially fully extended. The completed compression cycle is shown in FIG. 9c with the leading lobe just beyond TDC.

Air entrained in the inlet and compression cycles is compressed into the combustion chamber previously described with respect to FIG. 2. Compression ramp 38 passes air entrained in the trailing portion of the rotor sector into the combustion chamber. For the embodiment shown in the drawings, the combustion chamber is located within the leading 30% of the rotor sector between the lobes. The reduced lateral width of the compression ramp maximizes the compressed gas volume in the combustion chamber for ignition. Introduction of fuel is accomplished in the embodiment shown using carburetion upstream of the combustion air inlet with ignition occurring with the chamber positioned substantially at TDC. In alternative embodiments, direct injection is accomplished through ports through the case wall or side plates in the appropriate region where the trailing lobe has passed the intake port. Each individual combustion volume encompasses the case wall swept volume bounded by the top and bottom side plates, the respective leading and trailing lobe faces and the rotor face.

The respective volumes between the leading and trailing lobe pairs are compressed reaching a point of maximum compression when, for the embodiment shown, the leading and trailing lobes are essentially equidistant to the center of the concentric diameter arc defining the combustion portion 77 as previously described with respect to FIG. 5a. At this point the majority of combustion volume has been compressed into the combustion chamber and compression ramp 38. The compression ramp provides a lead in volume to the combustion chamber for air compressed ahead of the trailing lobe sweeping against the first concentric arc, allowing compressed volumes to shift ahead of rotation into the combustion chamber. The combustion chamber placement in the embodiment shown is to improve the reactive pressure against the back of the leading lobe by minimizing post combustion surface cooling of the reactive gasses. Torque in rotation is achieved via the differential pressure distribution on individual lobe faces resulting from differential post-combustion lobe surface area during expansion.

Figure 9E:
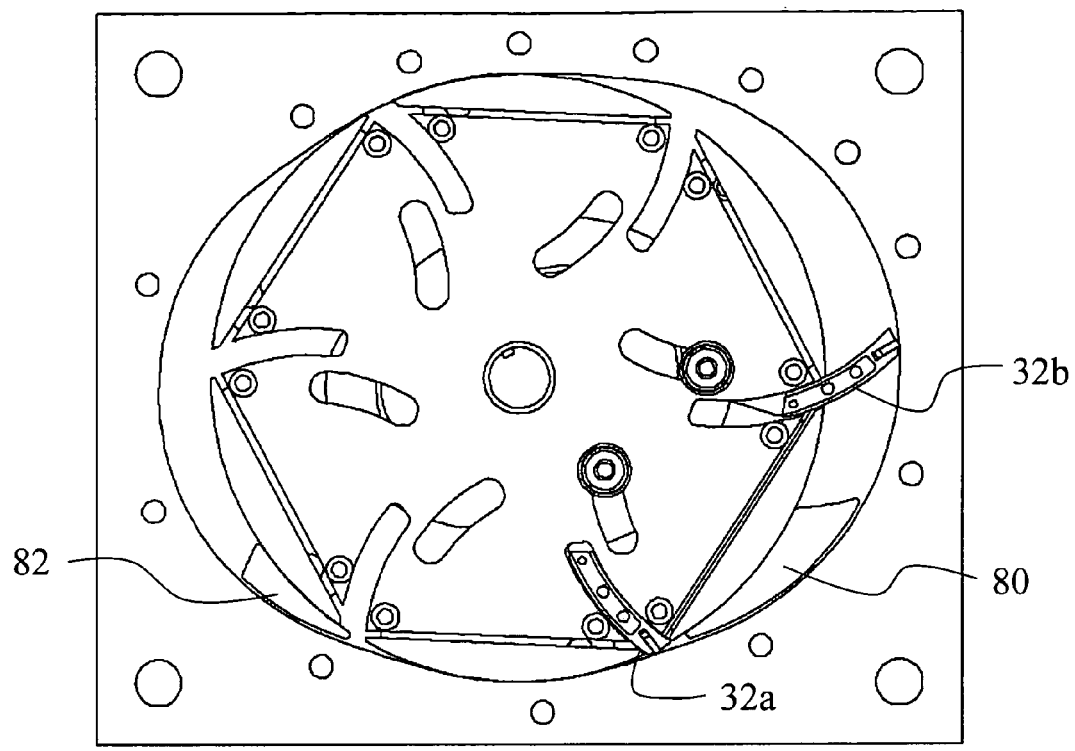
Figure 9D:
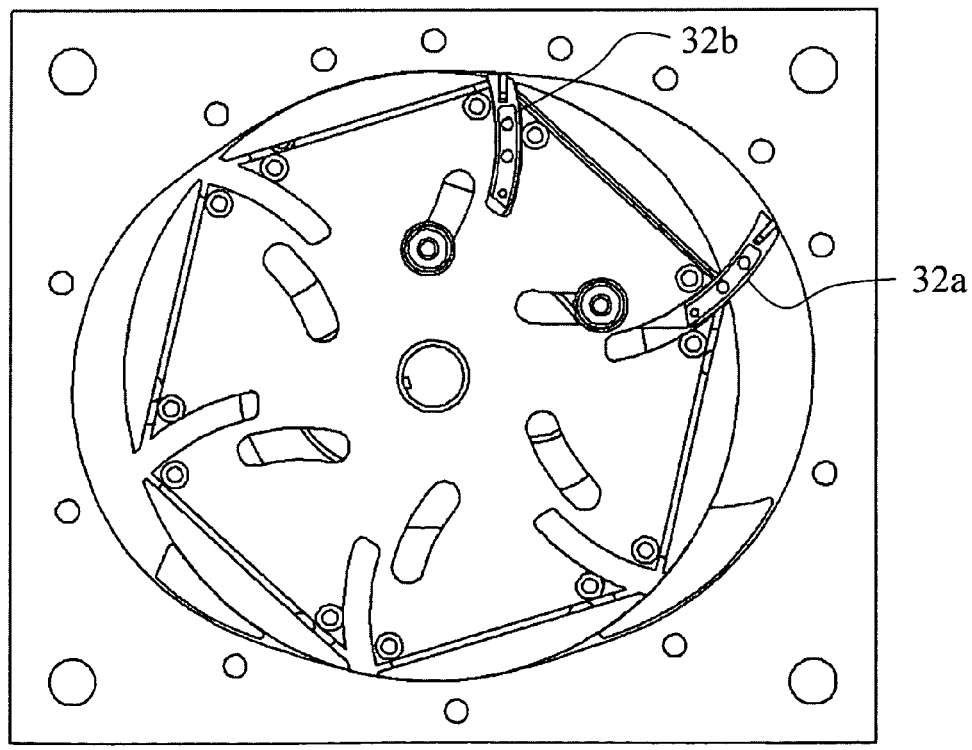

Initial expansion of the combustion mixture is shown in FIG. 9d with the leading lobe extending along the expansion contour of the case with the trailing lobe fully retracted at TDC. The expansion continues with the leading and trailing lobe substantially fully extended.

The exhaust cycle commences with passing of the exhaust port by the leading lobe as shown in FIG. 9e where the leading lobe is again substantially retracted and the trailing lobe fully extended, sweeping the exhaust gas through the expansion volume to exhaust port 82. The exhaust cycle substantially completes with the trailing lobe transiting the exhaust port and the leading lobe passing BDC for initiation of the next intake cycle.

For the embodiment of the invention shown in the drawings having six lobes, the five combustion process described—Intake, Compression, Combustion, Expansion and Exhaust occur six times in each rotor revolution providing high power density relative to external engine volume. Each lobe acts simultaneously as a leading and trailing lobe of adjacent volume pairs. The ability to vary the compression volume relative to the expansion volume by employing alternate engine case first and second portion volume geometries and respective lobe actuation geometry, allows the pressure/volume work cycle to be optimized to the intended use of the engine.

In an alternate embodiment tailored for high altitude operation, employing a reverse asymmetry of compression to expansion obviates the necessity for a turbocharger. An enlarged portion of the intake/compression volume performs in compression substituting for the turbocharger. This alternate embodiment could employ a waste valve in the engine case to limit the air volumes compressed at lower altitude to the rating of the engine. Additionally, in a second alternate embodiment, the expansion volume could be significantly larger to reduce the expansion pressure at the opening of the exhaust port to near atmospheric allowing for a very quiet engine with a lower exhaust temperature and reduced thermal signature. Hence the asymmetry of internal volumes may be adjusted for optimal power to efficiency balance for a given rotational energy requirement. Ranging, by example, from near silent leaf blower/chainsaw propulsion to simple robust high altitude aircraft engines.

For an exemplary embodiment, a rotor of 25.4 cm diameter and 7 cm depth with pre-compression first volume of 240 cc compressed 8.6:1, combusted, expanded 14:1 into a 390 cc second volume, the 6 rotor volumes would displace approximately 1,440 cc per rotation. Accordingly, at 2,000 RPM roughly 7 lb./min of air is combusted; at 380,000 ft/lb/pound of combusted air, an output in the range of 60 kW (80 H.P.) would be expected.

This ability of the preferred embodiment to continue the combustion expansion beyond the volume originally compressed harnesses additional enthalpy in combustion gasses that is typically wasted by the exhaust venting significant pressures prematurely, as is the case in most symmetric combustion cycles.

In the embodiment shown the value of the expansion volume exceeding the compression volume may be seen in contrasting the engine efficiency formula for the ideal Otto Cycle thermodynamic efficiency ($\eta_t$) which is given by:

$$\eta_t = 1 - 1/r_v^{k-1}$$

with the formula for the "Asymmetric-Expansion Cycle" represented as:

$$\eta_t = 1 - 1/r_v^{k-1} \cdot k(r-1)/r^k - 1$$

With r being the isentropic ratio between the air volume compressed and the final volume of the full asymmetric expansion (volume compressed/volume expanded) it can be seen that the second segment of equation 2 serves to produce a multiple (i.e. 1.08) which improves the $\eta_t$ of the work cycle by such multiple relative to a standard symmetric Otto Cycle. Hence equation 2 may be used to calculate the theoretical efficiency $\eta_t$ of the embodied Asymmetric-Expansion Cycle.

The geometry of the lobe assembly for the embodiment shown in the drawings optimizes the motion and force reaction of the lobe while addressing the extension and retraction force and control requirements. The triangular shape of the pivot arms 44 allows placement of the rotation pins 46 and bushings 48 close to the circumference of the rotor maximizing the outward extension arc of the lobes facilitating a distribution of combustion gas forces on the extended lobe at an angle relatively tangent to rotation of the rotor during the expansion cycle. The pivot arm geometry also allows placement of the rotation pins at the maximum distance from the lobe, within the geometry of the rotor, to minimize the angular motion required for the lobe to follow the contour of the engine case and by extending the moment arm of the actuating force reducing the actuator bearing design requirements. The arcuate shape of the lobe itself, as a circular segment having a radius equal to the pin/lobe leg of the triangle, facilitates a seal-able smooth true radius path extension and retraction of the lobe with respect to the rotor. The side loading of the lobes, which has rendered many if not all sliding vane engines impractical, is transferred to the rotation pins of the lobe pivot arm which, operating in bushings within the rotor housing, are able to absorb such compression and expansion loading while retaining the low friction extension and retraction necessary for the lobe tip to accurately follow the contour of the engine case through rapid rotor rotation.

Placement of the cam actuation axle at a vertex opposing the pin/lobe leg of the triangle displaces the actuation slot in the rotor bottom and cover from the lobe slot to allow optimized mechanical amplification of the cam actuation profile, again within the constraints of the overall rotor geometry. By absorbing the operational accelerations of the lobe over a large effective cam area and having a separate cam race on each lobe side for each direction of acceleration, torsional forces on the lobe pivot arm and pins are avoided allowing for tighter seal clearances and a relatively lightweight lobe assembly. By combining a system of desmodromic lobe actuation via counter-rotating bearings with the transference of lobe force loadings to the pivot bushings the resulting engine maintains a high mechanical efficiency while performing six complete intake-compression-combustion-expansion-exhaust cycles per single rotation. As such the power density per unit of engine weight (as well as volume) is relatively high Spent gasses are efficiently purged with little exhaust carry-through due to a lack of significant intake exhaust function overlap, further enhancing thermodynamic efficiency and facilitating broad efficient power range with a relatively straight torque to RPM curve.

The embodiment shown is modified in alternative embodiments to allow for a hollow rotor drive shaft; such adaptation facilitating a spline, common shaft or individually Sprague clutched connection of multiple engines as individual "power blocks" within a common instillation such as a vehicle or generation station thereby effectively enabling load adaptive allocation of power or redundancy of power to a common shaft.

An alternative embodiment for the sealing and combustion chamber configurations of an engine employing the present invention is shown in FIGS. 10a-13. Basic operation of the lobes in the engine is as previously described. However, referring to FIGS. 10a-10c, the sealing of each lobe with the upper and lower cover in the engine is accomplished using side seal 132 and wedge shaped side seal 134. The wedge shaped side seal tapers from a bottom end 136 adjacent the bottom of the lobe to the tip 138 adjacent the apex of the lobe. The side seals employ slots 140 to receive the extended ends of tip seal 102 mounted in slot 108 in the apex of the lobe as described for prior embodiments. A curved or wave spring 106 resiliently supports the tip seal.

Figure 10A:
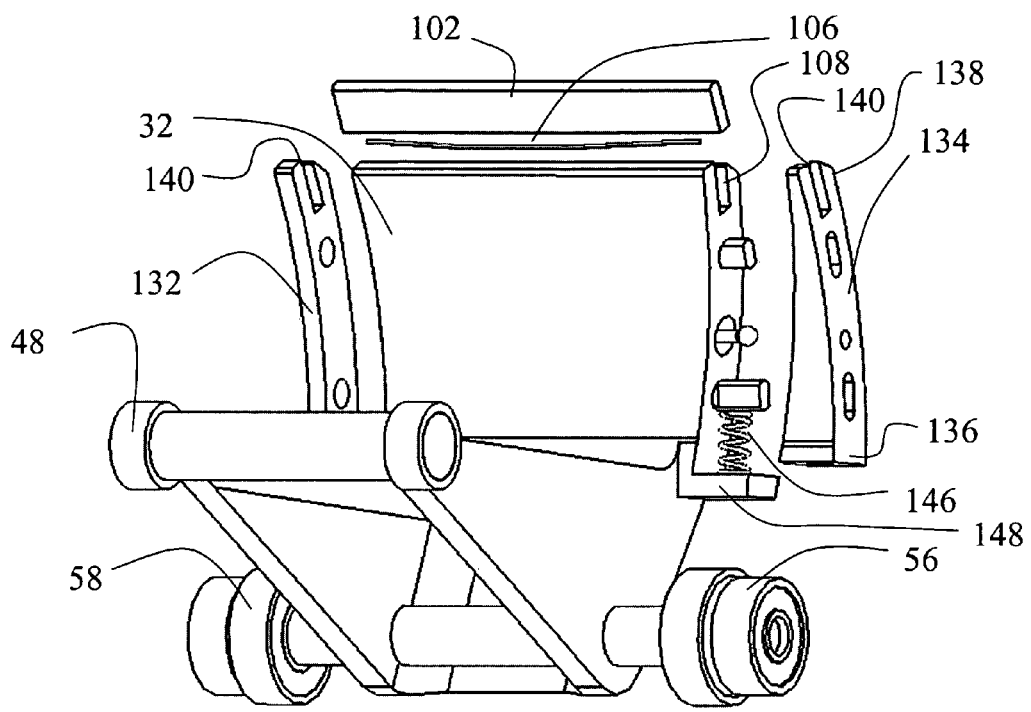
FIG. 10a is an exploded rear isometric view of one reciprocating lobe, associated actuation components and lobe side seals for a second embodiment of the invention employing an alternative sealing system.
Figure 10B:
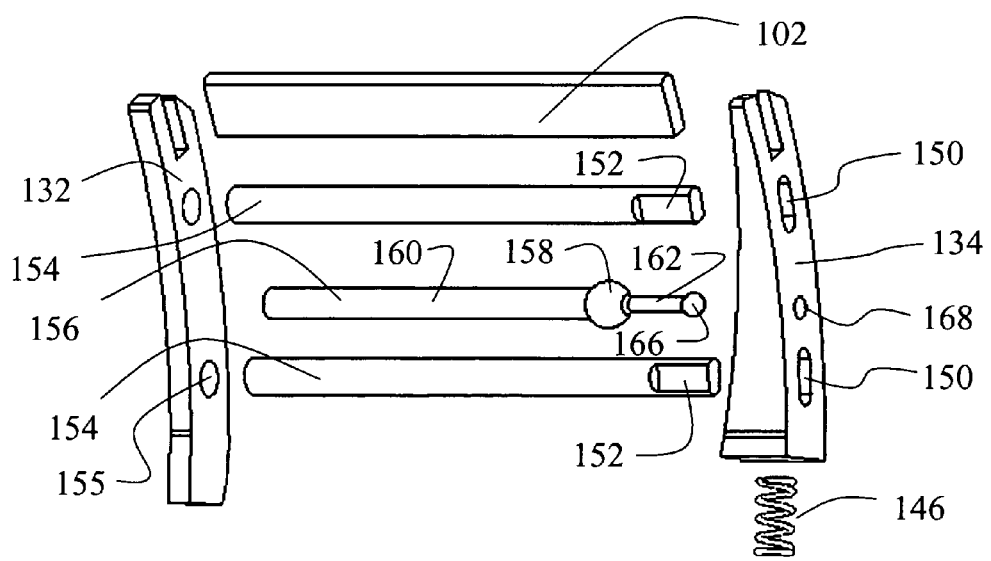
FIG. 10b is an exploded view of the side seals for the lobe of FIG. 10a, the apex wiper seal and the internal supporting elements for the side seals.
Figure 10C:
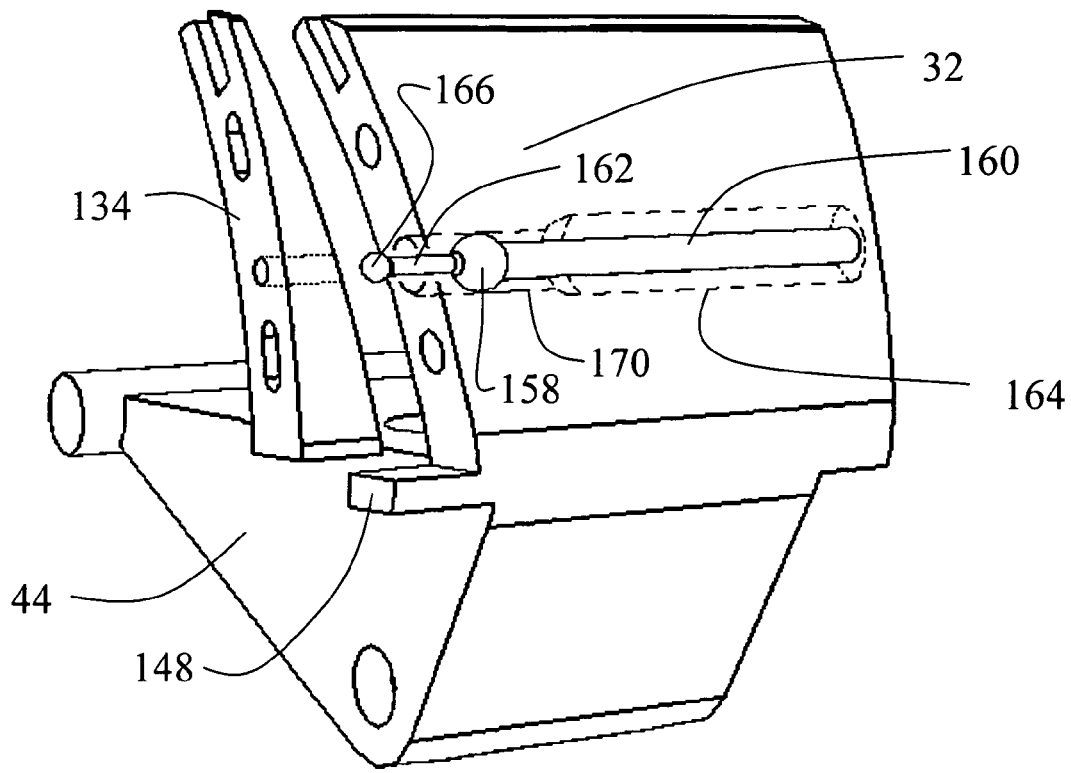
FIG. 10c is a front isometric partial section view of the lobe of FIG. 10a showing the positioning of the side seal balance bar.

The wedge shaped side seal is resiliently mounted with a spring 146 engaged between bottom end 136 and a land 148 extending from the bottom of the lobe. As best seen in FIG. 10b, slots 150 closely receive guide ends 152 of mounting rods 154 which are supported in transverse bores in the lobe. The guide ends translate within the slots allowing diametric motion of the wedge shaped side seal. For the embodiment shown, side seal 132 employs holes 155 to engage the mounting rods on the opposite side of the lobe. Resilient mounting of the wedge shaped seal in this manner accommodates wear of the side seals as well as thermal expansion by allowing the diametric movement of the wedge shaped seal. The taper maintains not only the seal on the wedge shaped seal but by reaction urges the lobe toward the other plate of the engine fully engaging side seal 132.

Due to its resilient mounting, the motion of the wedge shaped seal must be controlled to avoid unwanted overpressure at the apex end of the seal. A steel balance bar 156 having a pivot ball 158, reaction mass lever 160 and engagement arm 162 is supported within a cavity 164 in the lobe. The engagement arm terminates in a ball 166 received within a socket 168 in the wedge shaped seal. The pivot ball of the balance bar is closely engaged by a first bore 170 in the cavity while the reaction mass lever is free to move within an expanded portion of the cavity. For the embodiment shown, approximately a 3 to 1 lever arm differential between the center of mass of the reaction mass lever and the ball engaging the socket in the side seal provides sufficient reactive force to balance the forces on the side seal under imposed centripetal loads to preclude unwanted motion Those skilled in the art will recognize alternative mass balance configurations and dimensions based on the materials employed for fabrication.

Figure 10D:
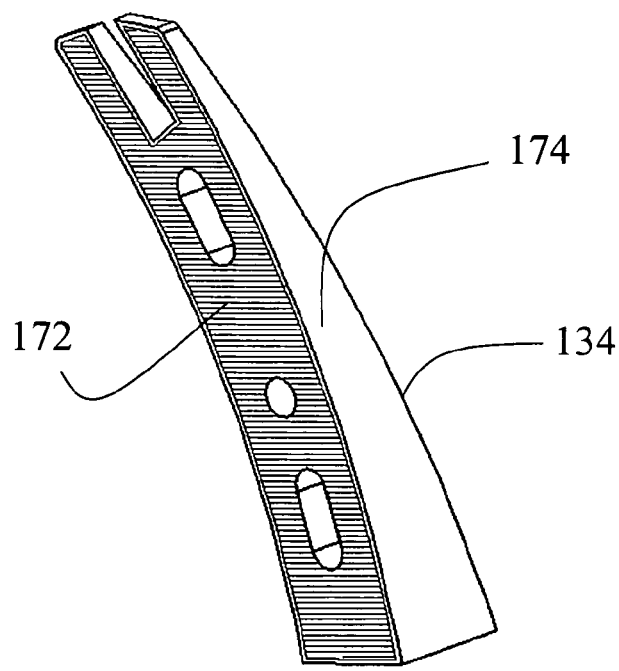
FIG. 10d is an isometric view of the wedge shaped side seal and insert.
Figure 11:
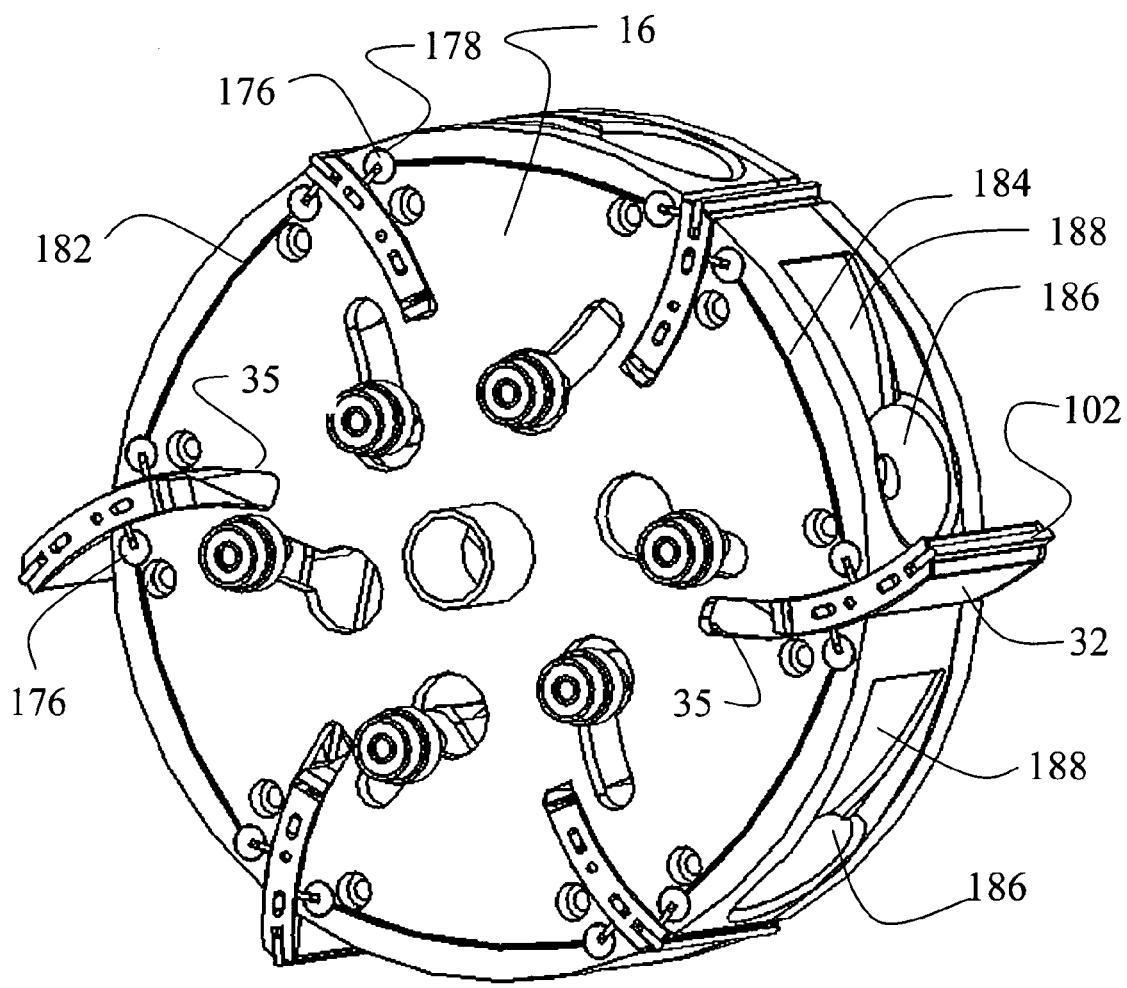
FIG. 11 is a top isometric view of the rotor employing the alternative seal and combustion chamber arrangement of the alternative embodiment.

The embodiment of the side seals shown in the drawings employs a carbon-graphite insert 172 received within a machined relief in the side seal wall as shown in FIG. 10d. The insert provides enhanced thermal stability and enhanced lubricity for the side seals while preserving a metal sealing surface 174 on the leading and trailing walls of the side seals for engaging surface seals to be described in greater detail with respect to FIGS. 12a and 12b.

Figure 12A:
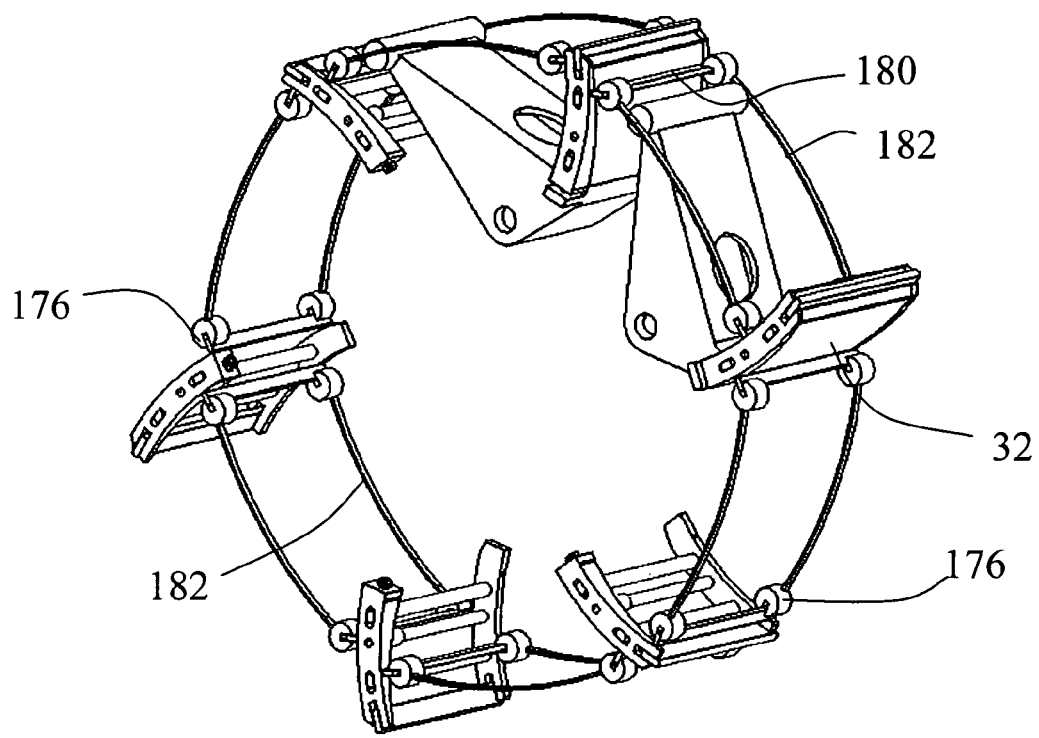
FIG. 12a is a partial isometric view of the sealing elements of the rotor and lobes showing two complete lobes, the side seal elements of the remaining four lobes and the button seal and arc seal arrangements for the rotor.
Figure 12B:
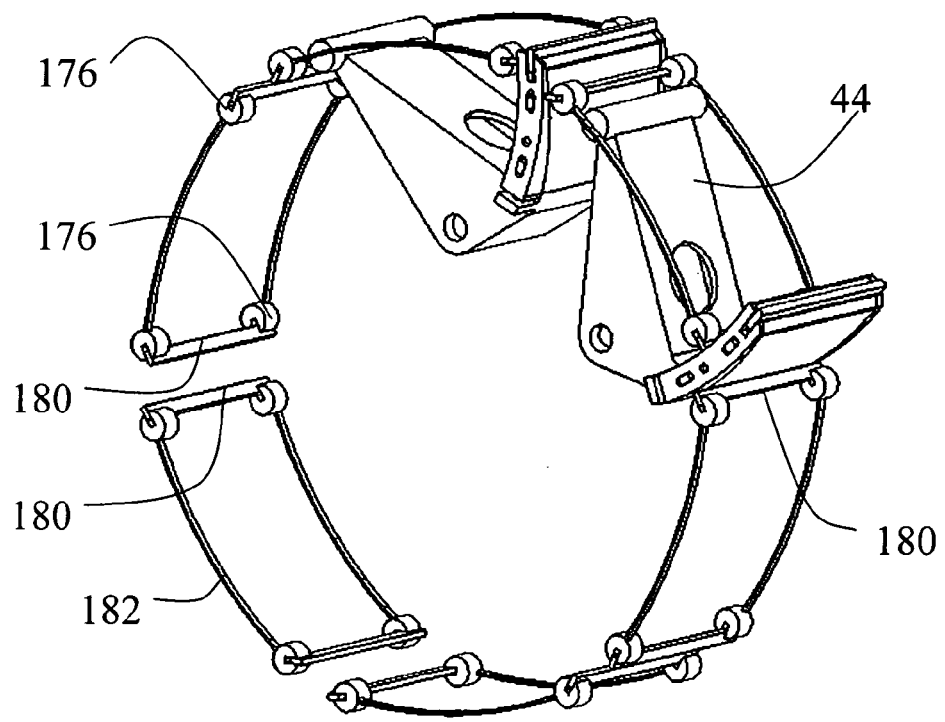
FIG. 12b is a partial isometric view of the sealing elements showing the two complete lobes and only the button seals with associated wiper seals and the arc seals for the four remaining lobe elements; and, FIG. 13 is a side isometric view of the two complete lobes of FIGS. 12a and 12b showing the details of the button seals with their associated wipers and the arc seals.
Figure 13:
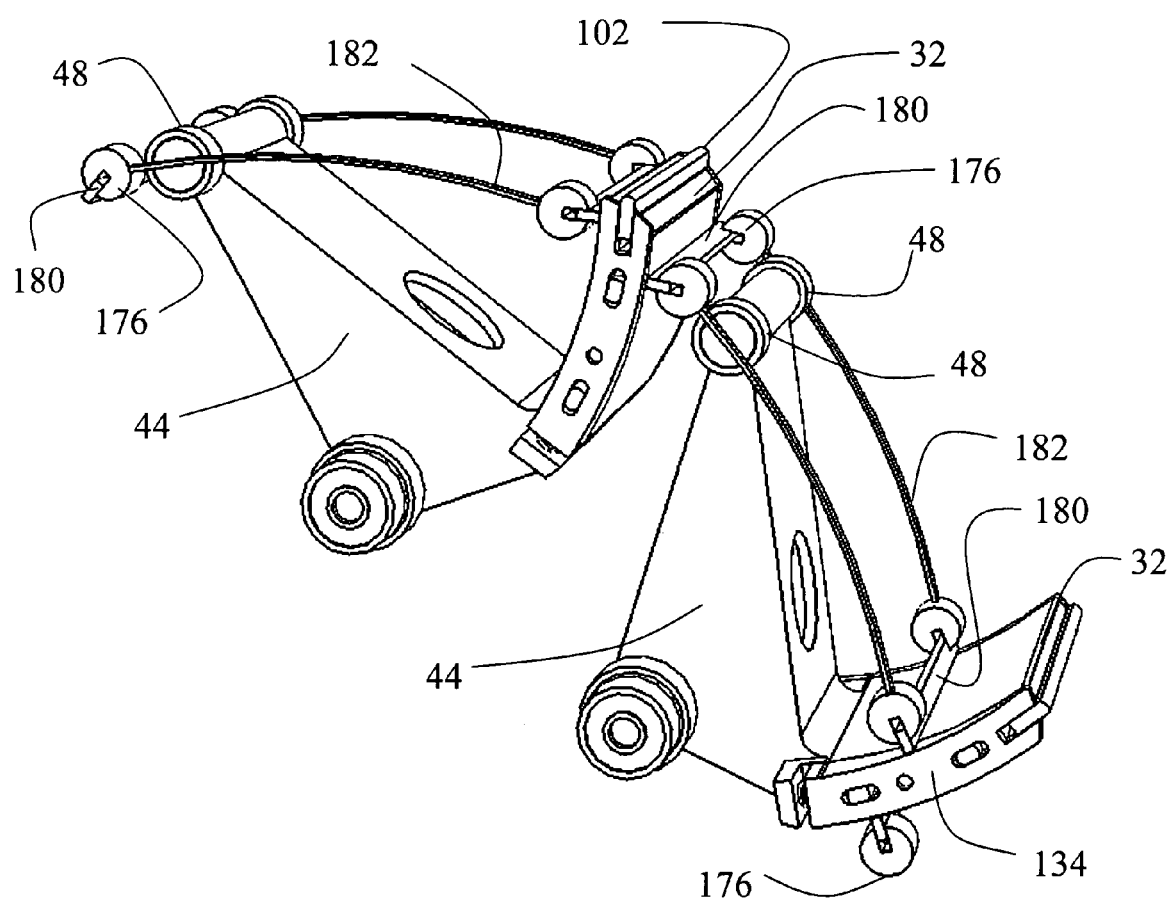

Sealing of the leading and trailing surfaces of the lobes in the alternative embodiment is provided by wiper seals as shown in FIGS. 11, 12a and 12b, and 13. Slotted buttons 176 are resiliently mounted in cylindrical reliefs 178 in the top and bottom surfaces of rotor 16. In embodiments as previously described, the upper surface will be in cover 24. As best seen in FIGS. 12a and 12b with the elements of the rotor removed for clarity, the slots in the buttons receive wiper seals 180 for the leading and trailing surfaces of the lobe. The buttons themselves provide a seal with the top and bottom covers, rotating for alignment of the wiper seals with respect to the lobe surface. Sealing of the rotor to the top and bottom covers intermediate the buttons is accomplished by arc seals 182 which extend between the leading and trailing buttons associated with each pair of lobes. The arc seals are received in grooves 184 in the upper and lower surfaces of the rotor. Contact of the wiper seals with the leading and trailing surfaces of the lobes is best seen in FIG. 13.

Returning to FIG. 11, a swirl combustion chamber 186 is employed with a tapered ramp 188 between each leading and trailing lobe for optimum combustion efficiency. The combustion cycle for this embodiment is as previously described with respect to FIGS. 9a-9e.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. An internal combustion engine comprising:
   an engine case containing a rotor;
   a plurality of identical lobes carried within the rotor, each lobe extendible from a slot in a cylindrical surface of the rotor to maintain a peripheral edge in continuous sealing contact with a contoured wall of the case, the contour having a first portion diverging from a first tangency point between the rotor and case wall and a second portion contracting from a first maximum divergence to a second tangency point between the rotor and case, and having a third portion diverging from the second tangency point to a second maximum divergence and a fourth portion converging to the first tangency point, the first and second portion defining a first volume and the third and fourth portion defining a second volume asymmetric to said first volume swept between adjacent sealed lobes;
   a combustion air inlet within the first portion of the contour;
   an exhaust outlet within the fourth portion of the contour;
   means for extending and retracting the lobes to maintain contact with the cylindrical surface of the rotor; and,
   means carried between each two adjacent lobes to initiate combustion of the combustion air with a leading lobe and a trailing lobe oppositely adjacent the second tangency point.

2. An engine as defined in claim 1 further comprising a plurality of pivot arms each carrying one of the plurality of lobes, each pivot arm mounted within the rotor and incorporating rotation pins distal from the lobe and rotatably constrained by the rotor immediately adjacent an outer circumference of the rotor and the slot for an adjacent lobe.

3. An engine as defined in claim 1 further comprising means for sealing the rotor to the top plate and bottom plate.

4. An engine as defined in claim 1 further comprising means for sealing the extensible pivoted lobe with the rotor, engine case, top plate and bottom plate.

5. An engine as defined in claim 1 wherein the contour of the engine case wall includes an arc portion substantially concentric with and immediately adjacent to the rotor to create a volumetric separator between an exhaust cycle and intake cycle, said portion including the first tangency point.

6. An engine as defined in claim 1 wherein the contour of the engine case wall includes an arc portion substantially concentric with and immediately adjacent to the rotor to form a minimum compression volume and to extend the time of maximum compression to fully initiate combustion, said portion including the second tangency point.

7. An engine as defined in claim 1 wherein the first volume exceeds the second volume for high altitude engine operation.

8. An engine as defined in claim 1 wherein the second volume exceeds the first volume for increased thermal efficiency.

9. An engine as defined in claim 1 wherein the second volume exceeds the first volume by an amount required for substantially complete combustion air expansion and reduced exhaust noise.

10. An engine as defined in claim 1 wherein the second volume exceeds the first volume by an amount required to minimize the thermal signature of the exhaust.

11. An internal combustion engine comprising:

an engine case containing a rotor;

a plurality of identical lobes carried within the rotor, each lobe extendible from a slot in a cylindrical surface of the rotor to maintain sealing contact with a contoured wall of the case, the contour having a first portion diverging from a first tangency point between the rotor and case wall and a second portion contracting from a first maximum divergence to a second tangency point between the rotor and case, and having a third portion diverging from the second tangency point to a second maximum divergence and a fourth portion converging to the first tangency point, the first and second portion defining a first volume and the third and fourth portion defining a second volume asymmetric to said first volume;

a plurality of pivot arms each carrying one of the plurality of lobes, each pivot arm mounted within the rotor and incorporating rotation pins distal from the lobe and rotatably constrained by the rotor immediately adjacent an outer circumference of the rotor and the slot for an adjacent lobe;

bearings supported by each pivot arm and extending from the rotor to be received within a race for desmodromic actuation of extension and retraction of the lobe;

a combustion air inlet within the first portion of the contour;

an exhaust outlet within the fourth portion of the contour; and means carried between each two adjacent lobes to initiate combustion of the combustion air with a leading lobe and a trailing lobe oppositely adjacent the second tangency point.

12. An engine as defined in claim 11 wherein the race comprises a first race in a top plate of the engine and a second race in a bottom plate of the engine and the bearings comprise a first pair of extension bearings mounted one on each end of an axle extending through the pivot arm to be received one in each of the first and second race for contact with an inner step of each race and a second pair of retraction bearings mounted on the axle inboard of the first pair to be received one in each of the first and second race for contact with an outer wall of each race.

13. An engine as defined in claim 11 further comprising side seals mounted to the lobe for engagement with the top and bottom plates and a tip seal extending from the lobe tip for sealing the interface of the lobe to the cylinder case.

14. An engine as defined in claim 13 wherein at least one of the side seals comprises a wedge tapering from adjacent a base of the lobe to the lobe tip, the at least one side seal resiliently mounted to be urged toward the lobe tip.

15. An engine as defined in claim 14 further comprising a balance bar coupled to the at least one side seal for balancing responsive to centripetal loading.

16. An engine as defined in claim 13 further comprising wiper seals engaging a leading and a following surface of each lobe, said wiper seals engaged at an upper and a lower end by a slotted button mounted in a receiving relief in an upper surface of the rotor and a receiving relief in a lower surface of the rotor respectively.

17. An engine as defined in claim 16 further comprising arc seals mounted in grooves in the upper surface of the rotor intermediate the wiper seal button reliefs for adjacent slots for the lobes and arc seals mounted in grooves in the lower surface of the rotor intermediate the wiper seal button reliefs for adjacent slots for the lobes.

18. An engine as defined in claim 13 wherein the side seals employ a carbon graphite insert.

19. An internal combustion engine comprising:

an engine case containing a rotor;

a plurality of identical lobes carried within the rotor, each lobe extendible from a slot in a cylindrical surface of the rotor to maintain sealing contact with a contoured wall of the case, the contour having a first portion diverging from a first tangency point between the rotor and case wall and a second portion contracting from a first maximum divergence to a second tangency point between the rotor and case, and having a third portion diverging from the second tangency point to a second maximum divergence and a fourth portion converging to the first tangency point, the first and second portion defining a first volume and the third and fourth portion defining a second volume asymmetric to said first volume;

a plurality of first L shaped seals extending from first grooves in an upper surface of the rotor intermediate adjacent slots for the lobes and adjoining second grooves in a trailing wall of each slot; and a plurality of second L shaped seals extending from third grooves in a lower surface of the rotor intermediate adjacent slots for the lobes and adjoining fourth grooves in a leading wall of each slot such L shaped seals thereby functioning to seal the leading and following surface of each lobe in extension and retraction to the main body of the rotor;

combustion air inlet within the first portion of the contour;

an exhaust outlet within the fourth portion of the contour;

means for extending and retracting the lobes from and to the cylindrical surface of the rotor; and, means carried between each two adjacent lobes to initiate combustion of the combustion air with a leading lobe and a trailing lobe oppositely adjacent the second tangency point.

20. An engine as defined in claim 19 further comprising:

a spring loaded lobe tip seal sealing the interface of the lobe to the engine case; and, a pair of lobe side seals of conformal thickness and curvature in section to the lobe, spring loaded to maintain a seal between the lobe and the top and bottom plates and grooved to accommodate the lobe tip seal.

21. An internal combustion engine comprising:

an engine case containing a rotor;

plurality of identical lobes carried by pivot arms within the rotor, each lobe extendible from a slot in a cylindrical surface of the rotor to maintain a peripheral edge in continuous sealing contact with a contoured wall of the case, each pivot arm mounted within the rotor and incorporating rotation pins distal from the lobe and rotatably constrained by the rotor proximate an outer circumference of the rotor and proximate the slot for an adjacent lobe, the engine case contour having a first portion diverging from a first tangency point between the rotor and case wall and a second portion contracting from a first maximum divergence to a second tangency point between the rotor and case, and having a third portion diverging from the second tangency point to a second maximum divergence and a fourth portion converging to the first tangency point;

a combustion air inlet within the first portion of the contour;

an exhaust outlet within the fourth portion of the contour;

means for extending and retracting the lobes to maintain contact with the cylindrical surface of the rotor; and, means carried between each two adjacent lobes to initiate combustion of the combustion air with a leading lobe and a trailing lobe oppositely adjacent the second tangency point.

22. An engine as defined in claim 21 wherein the first and second portion of the case contour define a first volume and the third and forth portion define a second volume asymmetric to said first volume.

23. An engine as defined in claim 22 wherein the first tangency point and second tangency point are diametrically offset.

24. An engine as defined in claim 21 wherein the contour of the engine case wall includes a portion substantially concentric with and immediately adjacent to the rotor to create a volumetric separator between an exhaust cycle and intake cycle, said portion including the first tangency point.

25. An engine as defined in claim 21 wherein the contour of the engine case wall includes a portion substantially concentric with and immediately adjacent to the rotor to form a minimum volume and extend the time of maximum compression to fully initiate combustion, said portion including the second tangency point.

* * * * *